(12) United States Patent
Lam et al.

(10) Patent No.: US 8,379,800 B2
(45) Date of Patent: Feb. 19, 2013

(54) CONFERENCE SIGNAL ANOMALY DETECTION

(75) Inventors: Warren M. Lam, Redmond, WA (US);
Hosam A. Khalil, Redmond, WA (US);
Vinod Prakash, Redmond, WA (US);
Sang K. Choe, Redmond, WA (US);
Hong Wang Sodoma, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 141 days.

(21) Appl. No.: 13/075,130

(22) Filed: Mar. 29, 2011

(65) Prior Publication Data

US 2012/0250830 A1    Oct. 4, 2012

(51) Int. Cl.
*H04M 3/08* (2006.01)
(52) U.S. Cl. .................. 379/32.01; 379/406.01
(58) Field of Classification Search .............. 379/32.01, 379/406.01
See application file for complete search history.

(56) References Cited

U.S. PATENT DOCUMENTS

| 5,305,309 | A | 4/1994 | Chujo | |
|---|---|---|---|---|
| 6,973,124 | B2 * | 12/2005 | Miller | 375/222 |
| 7,684,049 | B2 * | 3/2010 | De Groot et al. | 356/511 |
| 8,195,472 | B2 * | 6/2012 | Crockett | 704/503 |
| 2006/0140392 | A1 | 6/2006 | Ahmadi | |
| 2008/0240413 | A1 | 10/2008 | Mohammad | |
| 2009/0324040 | A1 * | 12/2009 | Lindop et al. | 382/131 |
| 2010/0135481 | A1 | 6/2010 | Frauenthal | |
| 2010/0177884 | A1 | 7/2010 | Prakash | |
| 2010/0322387 | A1 | 12/2010 | Cutler | |

OTHER PUBLICATIONS

Voice and Unvoice Decision; http://clear.rice.edu/elec532/PROJECTS00/vocode/uv/uvdet.html; May 10, 2000; 7 pages.
Enhanced Media Features; http://msdn.microsoft.com/en-us/library/dd441242%28office.13%29.aspx; Jan. 16, 2009; 2 pages.

* cited by examiner

*Primary Examiner* — Creighton Smith
(74) *Attorney, Agent, or Firm* — Merchant & Gould

(57) ABSTRACT

Detecting at least one of an echo detector and a noise detector based on analysis of audio streams transmitted to and received from each endpoint of a conference. When certain characteristics of the respective audio streams for a given endpoint are classified as significant against certain criteria, a determination is made as to whether that endpoint is a source of echo and/or noise. Subsequent actions are taken to alert users and/or prevent broadcast of impaired signals.

20 Claims, 14 Drawing Sheets

CONFERENCE SIGNAL ANOMALY DETECTION

BACKGROUND

When participating in a teleconference, participants often use a wide range of devices and different types of connections. This may lead to quality issues that arise due to the presence of one or more contributing sources of undesired audio. In such scenarios, impaired signals are broadcast to all participants, often making the teleconference difficult or impossible to conduct.

SUMMARY

The present disclosure is generally directed to systems and methods for detecting an anomaly in a teleconference communication signal.

In one aspect, a method for detecting an anomaly in a teleconference communication signal is disclosed. The example method comprises: receiving, at a computing device, a first signal comprising audio generated by a first endpoint of a plurality of endpoints connected to a teleconference; receiving a second signal comprising a summation of audio generated by each of the plurality of endpoints other than the first endpoint; generating a first data sequence comprising a number of zero-crossings per unit time of the first signal; generating a second data sequence comprising a number zero-crossings per unit time of the second signal; calculating an inner product between the first and second data sequences; comparing a maximum value of the inner product to a first threshold value; and sending an alert notifying at least one of the plurality of endpoints that the first endpoint is a source of echo upon the maximum value of the inner product exceeding the first threshold value.

In another aspect, a computing device comprising a processing unit and a system memory connected to the processing unit is disclosed in which the system memory includes instructions that, when executed by the processing unit, cause the processing unit to implement a detection module configured to detect an anomaly in a communication signal of a teleconference. The example detection module comprises: a first module configured to implement signal processing of a first signal comprising audio generated by a first endpoint of a plurality of endpoints connected to the teleconference and a second signal comprising a summation of audio generated by each of the plurality of endpoints other than the first endpoint, wherein the signal processing includes level shifting the first and second signal to zero DC voltage offset and sampling at least one of the first and second signal to a common sample rate; a second module configured to generate a first data sequence comprising a number of zero-crossings per unit time of the first signal and generate a second data sequence comprising a number zero-crossings per unit time of the second signal; and a correlation module configured to calculate an inner product between the first and second data sequences, compare a maximum value of the inner product to a threshold value, and notify at least one of the plurality of endpoints that the first endpoint is a source of echo upon the maximum value exceeding the threshold value.

In yet another aspect, a computer readable storage medium having computer-executable instructions is disclosed in which, when computer-executable instructions are executed by a computing device, cause the computing device to perform steps comprising: receiving a first signal comprising audio generated by a first endpoint of a plurality of endpoints connected to a teleconference; receiving a second signal comprising a summation of audio generated by each of the plurality of endpoints other than the first endpoint; processing the first and second signal comprising level shifting the first and second signal to zero DC voltage offset and sampling at least one of the first and second signal to a common sample rate; generating a first data sequence comprising a number of zero-crossings per unit time of the first signal; generating a second data sequence comprising a number zero-crossings per unit time of the second signal; generating a third data sequence comprising an RMS noise value of the first signal per unit time; calculating an inner product between the first and second data sequences over a finite integer value n corresponding to a plurality of time delayed versions of the first and second data sequences, wherein the inner product is defined by a normalized cross-correlation function bound between −1 and 1; comparing a maximum value of the inner product to a threshold value; notifying at least one of the plurality of endpoints that the first endpoint is a source of echo upon the maximum value exceeding the threshold value; estimating a noise power based on the third data sequence; comparing the noise power to a second threshold value; and sending a noise alert notifying at least one of the plurality of endpoints that the first endpoint is a source of noise upon the noise power exceeding the second threshold value.

This Summary is provided to introduce a selection of concepts, in a simplified form, that are further described below in the Detailed Description. This Summary is not intended to be used in any way to limit the scope of the claimed subject matter. Rather, the claimed subject matter is defined by the language set forth in the Claims of the present disclosure.

DESCRIPTION OF THE DRAWINGS

Aspects of the present disclosure may be more completely understood in consideration of the following detailed description of various embodiments in connection with the accompanying drawings.

DETAILED DESCRIPTION

The present disclosure is generally directed to systems and methods for detecting an anomaly in a teleconference communication signal.

For example, in a voice conference that uses a controller for signal mixing and switching, at least one of an echo detector and a noise detector is deployed on the controller to obtain access to and analyze audio streams transmitted to and received from each endpoint of the voice conference. When certain characteristics of the respective audio streams for a given endpoint are classified as significant against certain criteria, a determination is made as to whether that endpoint is a source of echo and/or noise. Subsequent actions are taken to alert users and/or prevent broadcast of impaired signal(s).

Although not so limited, an appreciation of the various aspects of the disclosure will be gained through a discussion of the examples provided below.

Figure 1:
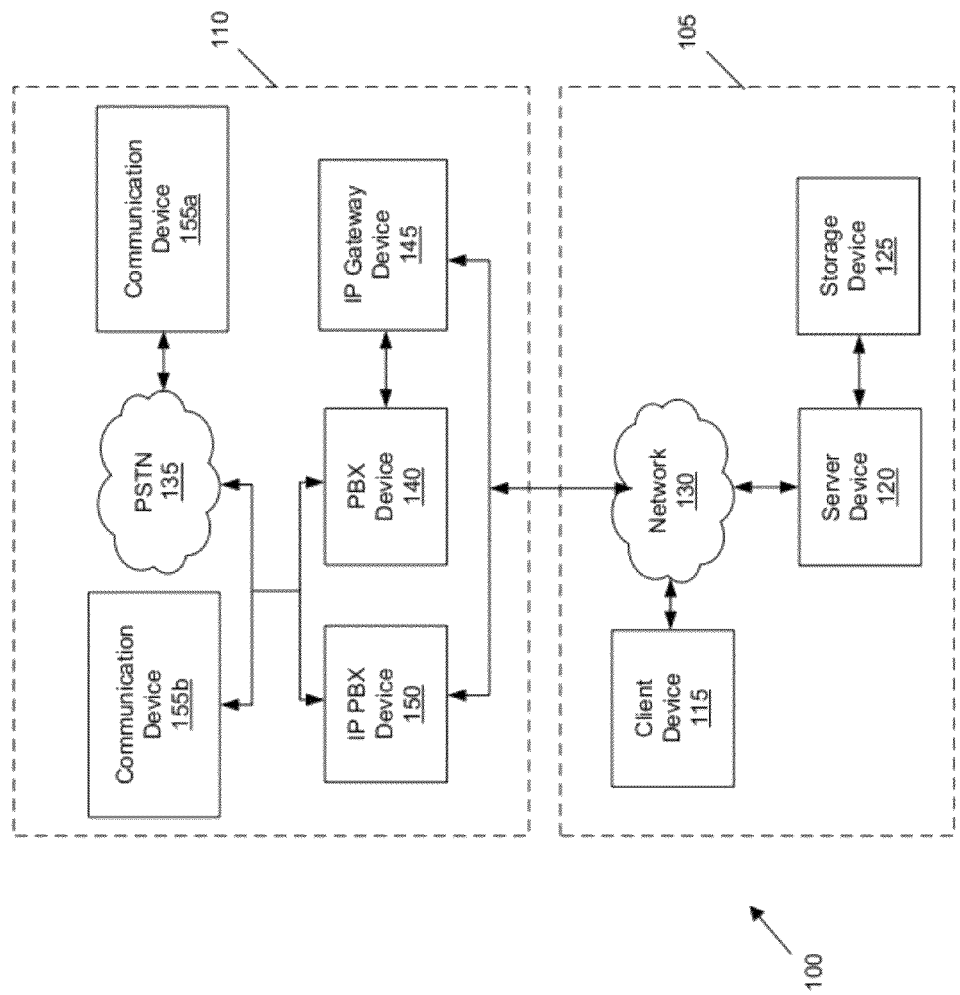
FIG. 1 shows an example networked communication environment.

FIG. 1 shows a networked communication environment 100 in accordance with the present disclosure. The example networked communication environment 100 includes an Internet Protocol (IP)-based packet-switched branch 105 and a telephony branch 110.

The packet-switched branch 105 includes a client device 115, a server device 120, a storage device 125, and a network 130. The telephony branch 110 includes a Public Switched Telephone Network (PSTN) 135, a private branch exchange (PBX) device 140, an IP gateway device 145, an IP PBX device 150, and a plurality of communication devices 155a-b (collectively, communication device 155). Other embodiments are possible. For example, the networked communication environment 100 may generally include more or fewer devices, networks, and other components as desired.

The client device 115 and the server device 120 are computing devices, described further below in connection with FIGS. 2 and 3.

The storage device 125 is an electronic data storage device, such as a relational database or any other type of persistent data storage device. The example storage device 125 stores data in a predefined format such that the server device 120 can query, modify, and manage electronic data stored thereon. Example electronic data includes information related to directory services, authentication services, administration services, and other services such as the ACTIVE DIRECTORY® directory service from Microsoft Corporation. Other embodiments of the storage device 125 are possible.

The network 130 is a bi-directional data communication path including any of a number of wireless or hardwired WAN, LAN, Internet, or other packet-based communication networks for data transfer between one or more compatibly configured devices. The example network 130 establishes a communication path for data transfer between the client device 115 and the server device 120. The network 130 additionally establishes a communication path for data transfer between components of the packet-switched branch 105 and components of the telephony branch 110, described in further detail below. Other embodiments of the network 130 are possible.

The PSTN 135 is bi-directional circuit-switched communication network in which multiple communications are transmitted across a similar transmission medium such as, for example, copper, fiber optic cable, etc. The example PSTN 135 establishes a communication path between the communication devices 155a-b in the telephony branch 110. The PSTN 135 additionally establishes a communication path for data transfer between the communication device 155 and components of the packet-switched branch 105. Other embodiments of the PSTN 135 are possible.

The PBX device 140 is a device based on circuit-switch protocols that switches communications in a telephony or circuit-switched network such as, for example, the PSTN 135. In general, the PBX device 140 is incompatible with packet-based communication networks. The IP gateway device 145 is a device configured to convert circuit-switch protocols used by the PBX device 140 to IP-based protocols. In this manner, the IP gateway device 145 enables communications between the communication device 155 and respective devices of the packet-switched branch 105.

The IP PBX device 150 is a device that switches communications in networks based on circuit-switch protocols as well as networks that leverage IP-based protocols. In this manner, the IP PBX device 150 is compatible with both circuit-switched communication networks and packet-based communication networks. In the example embodiment, the IP PBX device 150 enables direct communications between the communication device 155 and respective devices of the packet-switched branch 105.

The communication device 155 is an end user telecommunications device such as, for example, push button telephony. Other embodiments are possible. For example, in some embodiments, the communication device 155 is a computing device with telephony capability. Examples of such a computing device are described further below in connection with FIGS. 2 and 3.

Figure 2:
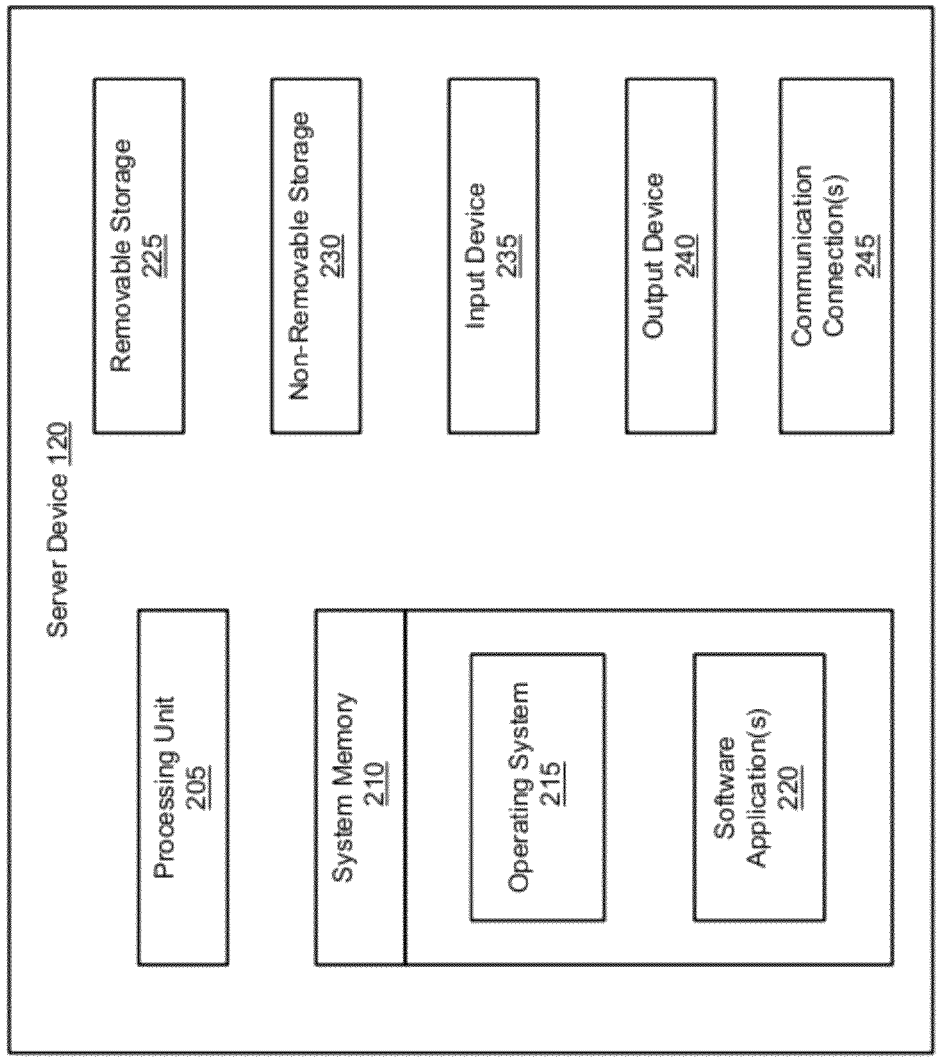
FIG. 2 shows an example computing device of the environment of FIG. 1.

Referring now to FIG. 2, the server device 120 of FIG. 1 is shown in further detail. As mentioned above, the server device 120 is a computing device. An example of a computing device includes a desktop computer, laptop computer, personal data assistant, feature phone, smartphone, and others.

The server device 120 includes at least one processing unit 205 and a system memory 210. The system memory 210 stores an operating system 215 for controlling the operation of the server device 120 or another computing device. One example operating system 215 is the WINDOWS® operating system from Microsoft Corporation. Other embodiments are possible.

The system memory 210 also includes one or more software applications 220 and may include program data. Software applications 220 may include many different types of single and multiple-functionality programs, such as a server program, an electronic mail program, a calendaring program, an Internet browsing program, a spreadsheet program, a program to track and report information, a word processing program, and many others.

One example program is the Office suite of business applications from Microsoft Corporation. Another example program includes the Lync™ Server real-time communications server, also from Microsoft Corporation. The Lync™ Server is an example of a business server that implements real-time communications and collaboration processes in support of instant messaging, file transfer, peer-to-peer and multiparty voice and video calling, ad hoc and structured conferences, public switched telephone network (PSTN) connectivity, and others.

The system memory 210 is computer-readable media. Examples of computer-readable media include computer storage media and communication media. Computer storage media is physical media that is distinguished from communication media.

Computer storage media includes physical volatile and nonvolatile, removable and non-removable media implemented in any method or technology for storage of information, such as computer-readable instructions, data structures, program modules, or other data. Computer storage media also includes, but is not limited to, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the server device 120. Any such computer storage media may be part of or external to the server device 120. Such storage is illustrated in FIG. 2 by removable storage 225 and non-removable storage 230.

Communication media is typically embodied by computer-readable instructions, data structures, program modules, or other data, in a modulated data signal, such as a carrier wave or other transport mechanism, and includes any information delivery media. The term "modulated data signal" means a signal that has one or more of its characteristics set or changed in such a manner as to encode information in the signal. By way of example, communication media includes wired media such as a wired network or direct-wired connection, and wireless media such as acoustic, RF, infrared and other wireless media.

The server device 120 also includes any number and type of an input device 235 and output device 240. An example input device 235 includes a keyboard, mouse, pen, voice input device, touch input device, and others. An example output device 240 includes a display, speakers, printer, and others. The server device 120 also includes a communication connection 245 configured to enable communications with other computing devices over a network (e.g., network 130 of FIG. 1) in a distributed computing system environment.

In some embodiments, the client device 115 and the communication device 155 of FIG. 1 are computing devices configured in a manner similar to that of the server device 120 described above.

Figure 3:
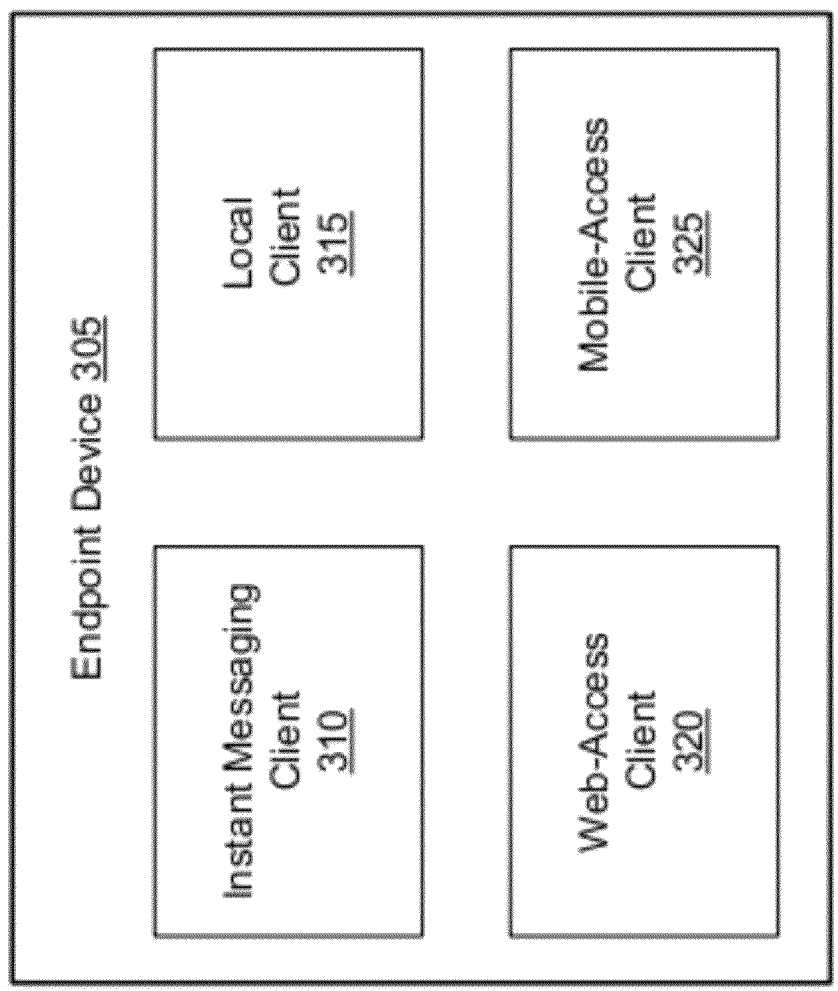
FIG. 3 shows an example teleconference endpoint device.

Referring now additionally to FIG. 3, a teleconference endpoint device 305 is shown. In general, the endpoint device 305 is similar to the client device 115 and/or the communication device 255 described above, and is additionally configured to include one or more different types of applications that interact with teleconference functionality and services of the server device 120. Example applications include an instant messaging (IM) client 310, a local client 315, a web-access client 320, and a mobile-access client 325.

The IM client 310 is configured as a messaging and conferencing service application that interacts with real-time communications and collaboration processes of the server device 120. The IM client 310 further integrates with a suite of applications executing on a respective client device. In one embodiment, the IM client 310 includes the Office Communicator client from Microsoft Corporation, which is an instant messaging client used with the Lync™ Server. The Office Communicator client enables a user to communicate and collaborate with other users via instant messaging, voice, desktop sharing and video, and other communication modalities during a teleconference as managed by the server device 120. The Office Communicator client integrates with programs of the Office suite of programs. Other embodiments of the IM client 310 are possible.

The local client 315 is a stand-alone application configured to connect to on-line teleconference meetings hosted by the server device 120. In one embodiment, the local client 315 includes the Office Live Meeting client of the Microsoft Office Live Meeting local web conferencing service operated by Microsoft Corporation. Other embodiments are possible.

The web-access client 320 is configured to access the server device 120 remotely using a network connection, such as the Internet. In one embodiment, the web-access client 320 is the Microsoft Communicator Web Access service of the Lync™ Server. In the example embodiment, a client device uses a web browser to connect to the Lync™ Server via the Communicator Web Access service. This brings up a user interface similar to an interface of the Office Communicator client in which a user can leverage the aforementioned capabilities of the Lync™ Server. Other embodiments of the web-access client 320 are possible.

The mobile-access client 325 is another type of application configured to interact with various functionality and services of the server device 120. In one embodiment, the mobile-access client 325 includes the Office Communicator Mobile application of the Lync™ Server. Office Communicator Mobile provides a real-time presence information, single number reach support and rich instant messaging capability via a user interface similar to an interface of the Office Communicator client. In this manner, a user operating a mobile device can leverage aforementioned capabilities of the Lync™ Server. Example mobile devices include a cellular telephone, a smartphone, a personal digital assistant, and others. Other embodiments of the mobile-access client 325 are possible such as, for example, third party teleconference endpoints that are able to dial into or join a conference by any other means.

Figure 4:
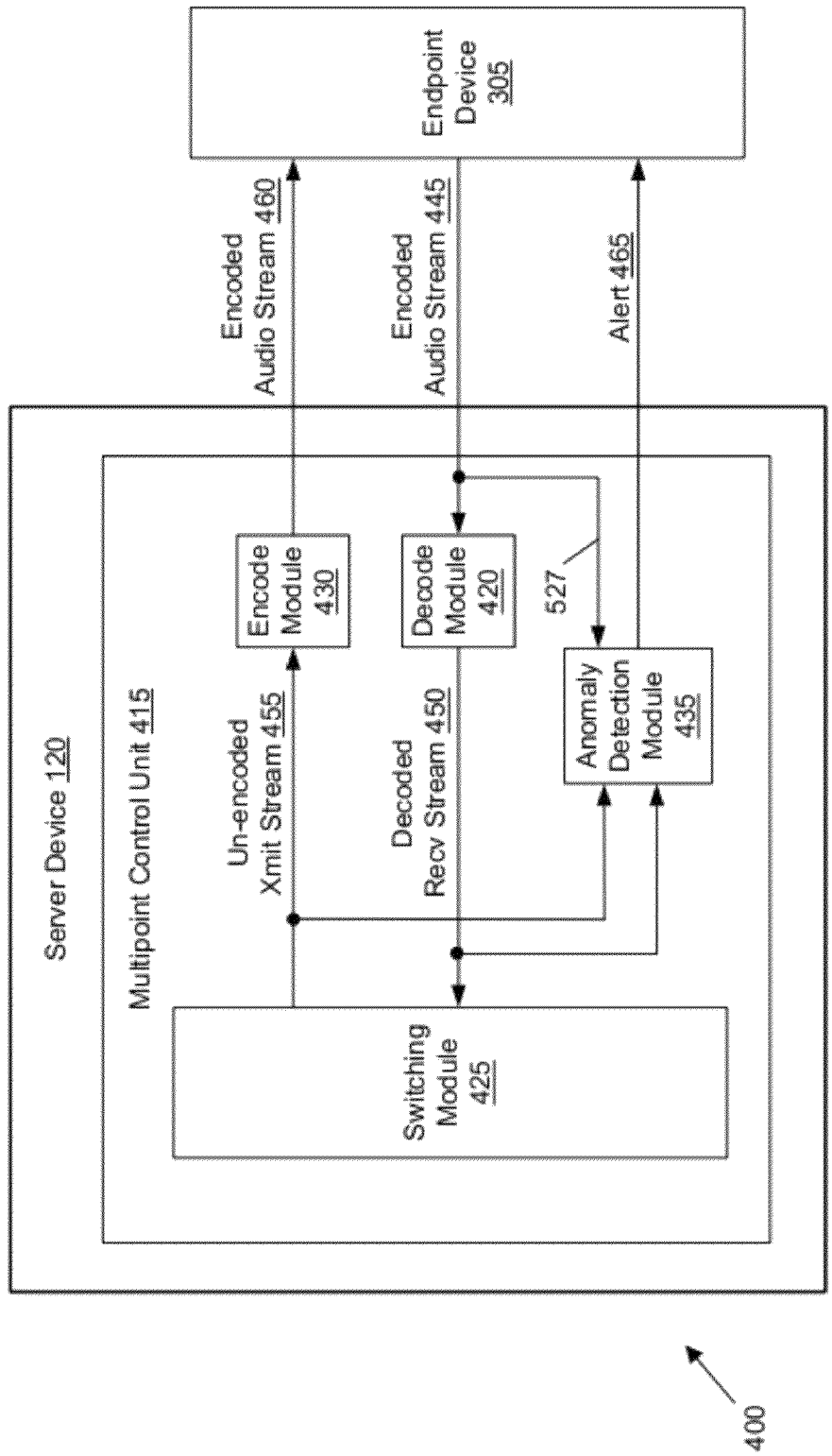
FIG. 4 shows example communications between a server and an endpoint during a teleconference.

Referring now to FIG. 4, a schematic diagram 400 illustrates example communications between the server device 120 and the endpoint device 305 in accordance with the present disclosure. Other embodiments of the diagram 400 are possible. For example, the diagram 400 may generally include more or fewer devices, and other components as desired.

The server device 120 includes a multipoint control unit (MCU) 415 configured for controlling teleconference signal flow. In one embodiment, the MCU 415 is implemented as logical modules of software executing on the server device 120, including a decode module 420, a switching module 425, an encode module 430, and a first anomaly detection module 435. Other embodiments are possible. For example, one or more of the respective modules of the MCU 415 may be implemented as hardware as desired.

During a teleconference, the decode module 420 receives a first encoded audio stream 445 (e.g., encoded PCM signal, etc.) from the endpoint device 305, and decodes the audio stream 445 to form a decoded Recv stream 450 (e.g., un-encoded PCM signal, etc.). The Recv stream 450 is transferred to the switching module 425, which generates an un-encoded Xmit stream 455 that at least includes a summation of all audio injected by all other endpoints (not shown) connected to the MCU 415 during the teleconference, excluding endpoint device 305. The encode module 430 receives and encodes the Xmit stream 455 to form a second encoded audio stream 460 that is transferred to all endpoints of the teleconference. In this example, the switching module 425 additionally receives a decoded Recv stream (not shown) from all other respective teleconference endpoints.

Referring now additionally to FIGS. 5-12, the first anomaly detection module 435 is shown and described in detail. In example embodiments described herein, the detection module 435 is configured for detecting echo in the teleconference by analyzing audio streams transmitted to and received from (e.g., Recv stream 450, Xmit stream 455) each endpoint connected to the MCU 415 during the teleconference. When correlation is observed between certain characteristics of the input audio streams, then a respective endpoint is likely causing echo. Results of the correlation are compared against a threshold to determine whether further action should be taken. Other embodiments are possible.

Figure 5:
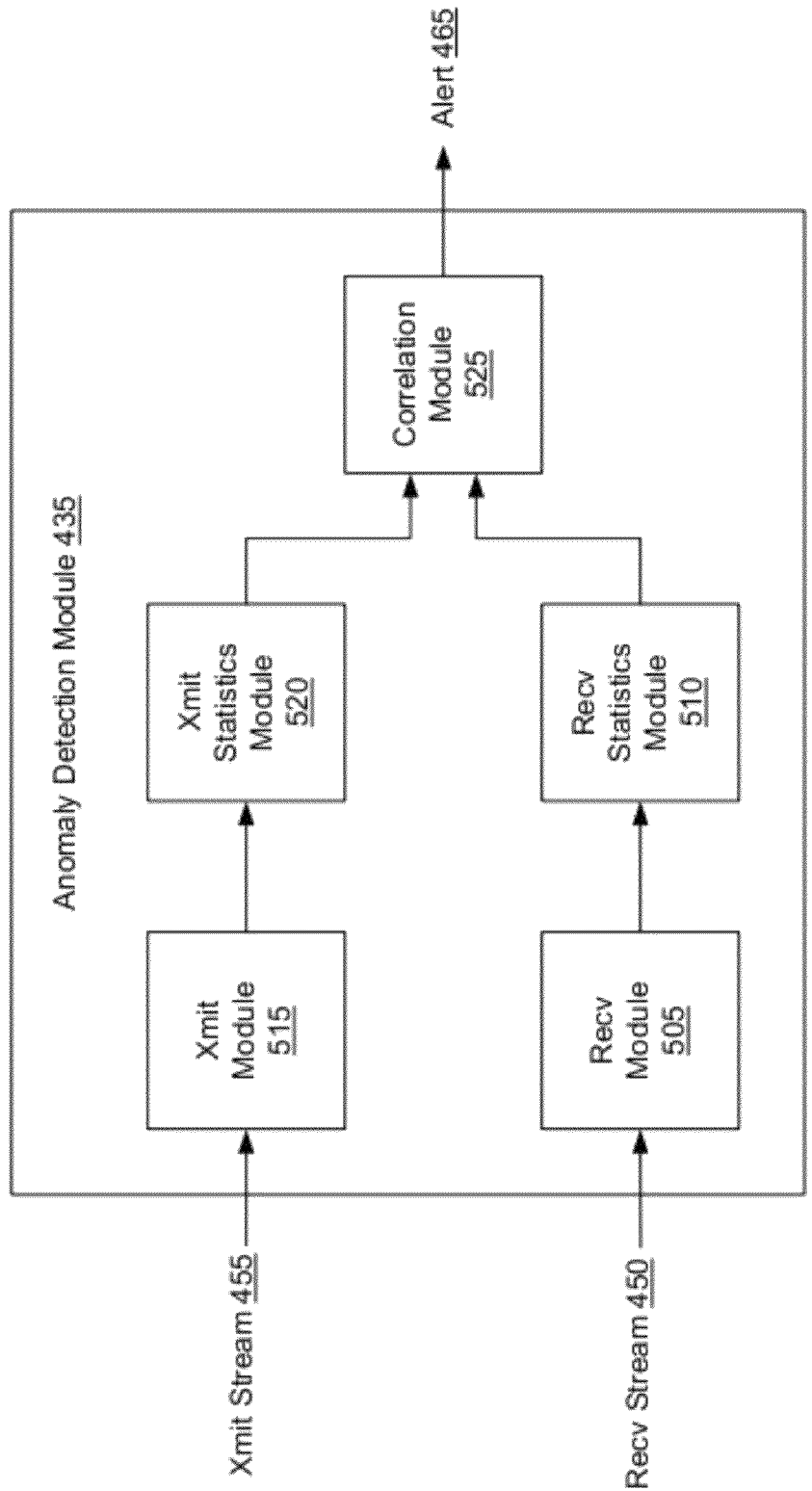
FIG. 5 shows a first example anomaly detection module.

FIG. 5 shows logical modules of the example detection module 435 including a Recv module 505, a Recv statistics module 510, an Xmit module 515, an Xmit statistics module 520, and a correlation module 525. Other embodiments are possible. For example, the detection module 435 may generally include more or fewer modules as desired. Additionally, functionality of one or more of the respective modules may be incorporated within an individual module as desired.

The Recv module 505 and the Xmit module 515 are signal processing modules. In the example embodiment, the Recv module 505 and the Xmit module 515 condition the Recv stream 450 and the Xmit stream 455, respectively, by level shifting these un-encoded audio streams to remove undesired DC components. Other embodiments are possible. For example, in some embodiments, the Recv module 505 receives the first encoded audio stream 445 as input, designated in FIG. 4 by a signal path 527. In this manner, the Recv module 505 operates on a signal that is in a network transmission format, as opposed to a signal that is in a non-network transmission format (i.e., decoded Recv stream 450).

In some embodiments, sample rate conversion is also performed on one or both of the Recv stream 450 and the Xmit stream 455 such that these audio streams exhibit a common sampling rate. Example supported sample rates for both the Recv stream 450 and the Xmit stream 455 include 8 kHz and 16 kHz. In examples in which the Recv stream 450 and the Xmit stream 455 sample rates are the same, no sample rate conversion is required. If mismatched, the 16 kHz stream is down-sampled to 8 kHz. Other signal processing techniques may be utilized by the Recv module 505 and the Xmit module 515 as well.

Figure 6:
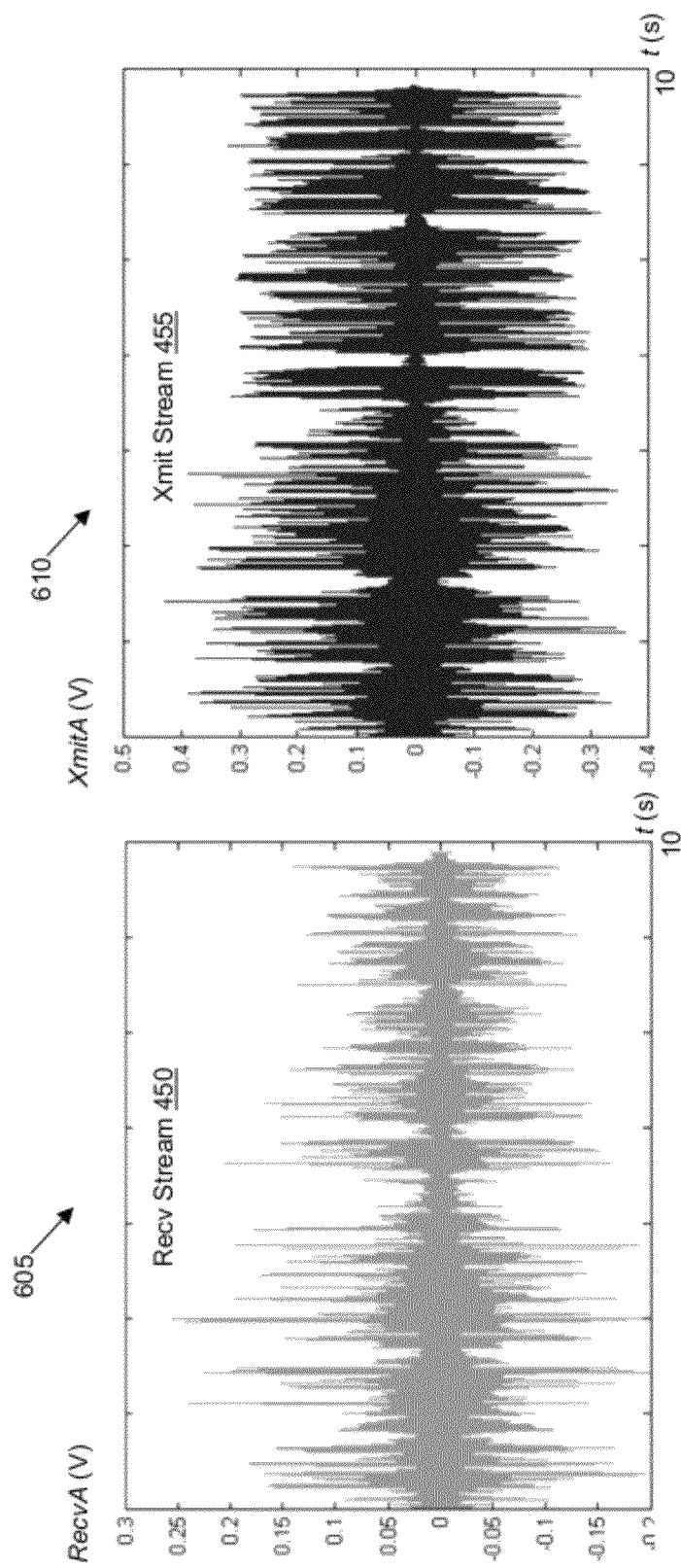
FIG. 6 shows example first and second audio streams received by the anomaly detection module of FIG. 5.

FIG. 6 shows an example first plot 605 illustrating signal amplitude RecvA of the Recv stream 450 as received by the Recv module 505 during an example time period t=ten (10) seconds. FIG. 6 also shows an example second plot 610 illustrating signal amplitude XmitA of the Xmit stream 455 as received by the Xmit module 515 during the time period t=ten (10) seconds.

In the example of FIG. 6, the Recv stream 450 as shown includes an actual echo of the Xmit stream 455. However, the Recv stream 450 is not an exact replica of the Xmit stream 455. For example, the Recv stream 450 differs in power, has a different envelope, and contains more external interference such as, for example, room noise picked up during the teleconference. Despite the differences, a human will generally not have difficulty perceiving the echo, and would view it as a hindrance or annoyance during the teleconference.

The Recv statistics module 510 and the Xmit statistics module 520 of the example detection module 435 are configured to quantify the presence of such human-perceived echo, by extracting relevant speech characteristics from the Recv stream 450 and Xmit stream 455. One example relevant speech characteristic includes zero-crossings per unit time. In general, voiced and unvoiced portions are distinguished by zero-crossing counts. Additionally, dominant frequencies within voiced portions can be identified by zero-crossing counts. Other types of relevant speech characteristics are possible as well.

Figure 7:
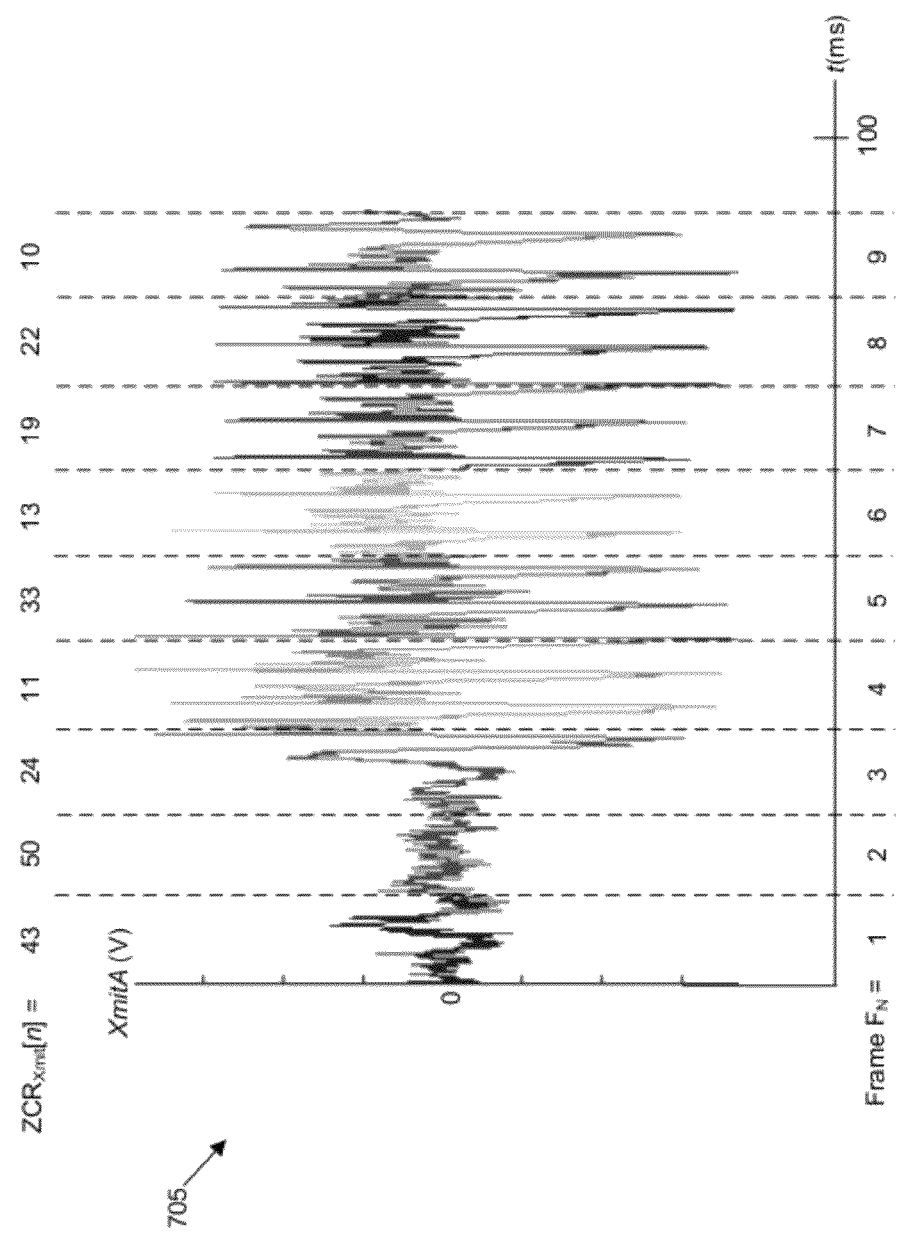
FIG. 7 shows a segment of the second audio stream of FIG. 6.

Continuing with the zero-crossing count example, the Recv statistics module 510 and Xmit statistics module 520 are configured to derive a frame-based zero-crossing statistic. In general, the frames are of uniform temporal duration. For example, FIG. 7 shows a ninety (90) millisecond segment 705 of the Xmit stream 455 shown in FIG. 6. In this example, the Xmit stream 455 is partitioned into ten (10) millisecond frames $F_N=F_1-F_9$. For each frame $F_1-F_9$, the Xmit statistics module 520 calculates a zero-crossing count to form an example sequence $ZCR_{Xmit}[n]$=43, 50, 24, 11, 33, 13, 19, 22, 10. As extrapolated from the sequence $ZCR_{Xmit}[n]$, unvoiced portions of the segment 705 (e.g., frames $F_1-F_2$) are noise-like and display on average at least twice the number of zero-crossings of the more tonal voiced portions (e.g., frames $F_4-F_9$) of the segment 705. In a similar manner, a sequence $ZCR_{Recv}[n]$ is formed by the Recv statistics module 510.

Figure 8:
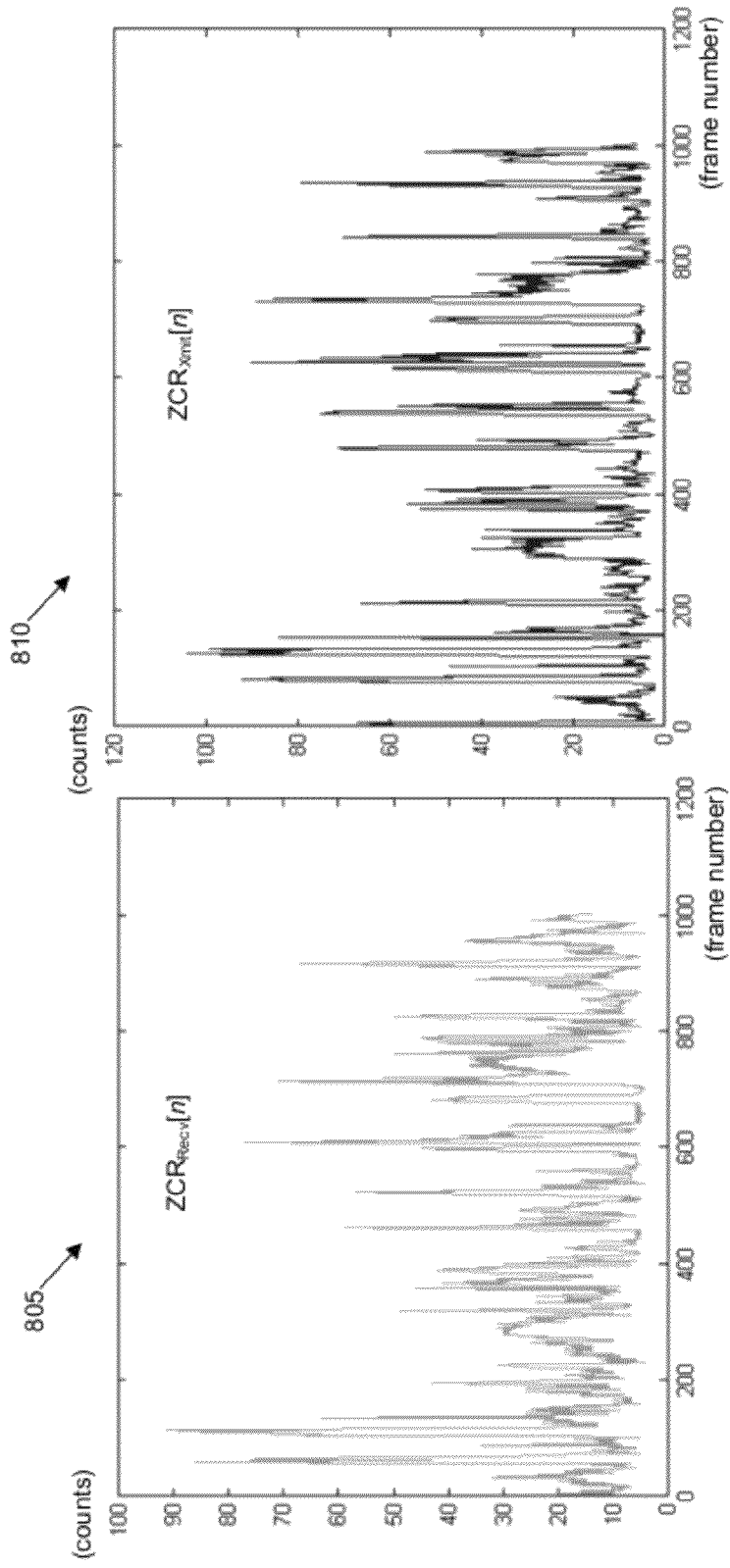
FIG. 8 shows an example first and second frame-based zero-crossing sequence derived from the first and second audio streams of FIG. 6.

For example, FIG. 8 shows a first plot 805 illustrating $ZCR_{Recv}[n]$ as derived from the Recv stream 450 of FIG. 6. FIG. 8 also shows a second plot 810 illustrating $ZCR_{Xmit}[n]$ as derived from the Xmit stream 455 of FIG. 6. As mentioned above, the Recv stream 450 includes an echo of the Xmit stream 455. This is reflected in the similarities between the locations and magnitudes of the peaks in the first plot 805 and second plot 810, which correspond to various speech features that remain intact in the echo.

The correlation module 525 of the detection module 435 is configured to quantify, via cross-correlation, such similarities between $ZCR_{Recv}[n]$ and $ZCR_{Xmit}[n]$ following formation of these respective sequences by the Recv statistics module 510 and Xmit statistics module 520.

In one embodiment, a cross-correlation function is generally defined as:

$$c_{Xmit,Recv}[n] = \sum_{k=-\infty}^{\infty} ZCR_{Xmit}[k] ZCR_{Recv}[n+k].$$

In this example, the summation variable k is an integer, and the variable n is a non-negative integer that represents a relative lag or delay between frames of the $ZCR_{Recv}[n]$ and $ZCR_{Xmit}[n]$ sequences. In practice, the correlation module 525 observes a finite number of terms from the $ZCR_{Recv}[n]$ and $ZCR_{Xmit}[n]$ sequences.

The example cross-correlation function defined as summation over a finite number of terms includes:

$$c_{Xmit,Recv}[n] = \sum_{k=0}^{K-1} ZCR_{Xmit}[k] ZCR_{Recv}[n+k].$$

For each n, this summation represents the dot or inner product between two vectors extracted from the $ZCR_{Recv}[n]$ and $ZCR_{Xmit}[n]$ sequences. Using dot product vector notation, the example summation is defined as:

$$c_{Xmit,Recv}[n] = \langle \vec{x}, \vec{r}_n \rangle.$$

The vectors $\vec{x}$ and $\vec{r}$ are defined as:

$$\vec{x} = \begin{bmatrix} x_0 \\ x_1 \\ \vdots \\ x_{K-1} \end{bmatrix} = \begin{bmatrix} ZCR_{Xmit}[0] \\ ZCR_{Xmit}[1] \\ \vdots \\ ZCR_{Xmit}[K-1] \end{bmatrix} \text{ and}$$

$$\vec{r}_n = \begin{bmatrix} r_{n,0} \\ r_{n,1} \\ \vdots \\ r_{n,K-1} \end{bmatrix} = \begin{bmatrix} ZCR_{Recv}[n] \\ ZCR_{Recv}[n+1] \\ \vdots \\ ZCR_{Recv}[n+K-1] \end{bmatrix}.$$

In the example embodiment, different values of n correspond to the dot product between sections of the $ZCR_{Recv}[n]$ sequence and the $ZCR_{Xmit}[n]$ sequence at different temporal offsets.

Figure 9:
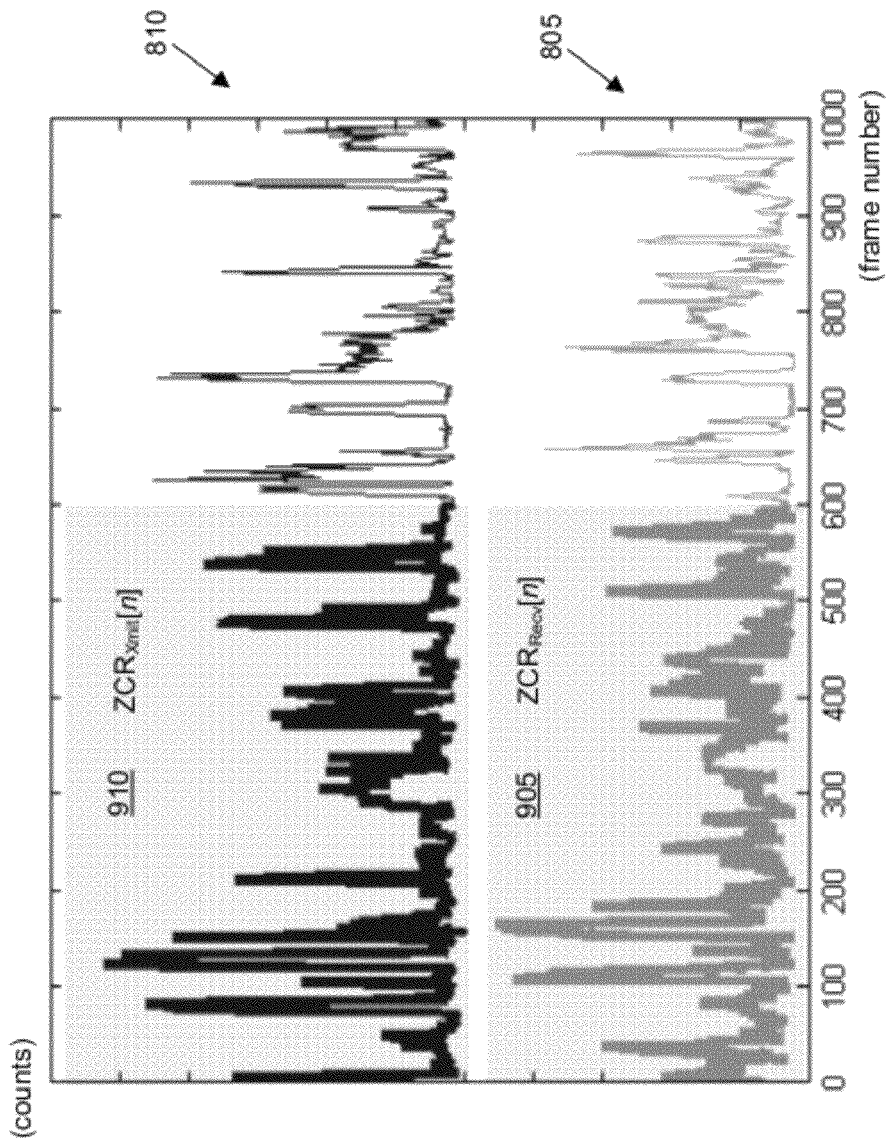
FIG. 9 shows zero-crossing samples of the first and second zero-crossing sequences of FIG. 8 involved in a first cross-correlation calculation for lag n=0.

For example, FIG. 9 illustrates the case lag n=0. In this example, the dot product is taken between time-aligned portions of $ZCR_{Recv}[n]$ and $ZCR_{Xmit}[n]$ in which shaded area 905 of the first plot 805, corresponding to six (6) seconds of the ten (10) second segment of the Recv stream 450 of FIG. 6, fully overlaps shaded area 910 of the second plot 810.

Figure 10:
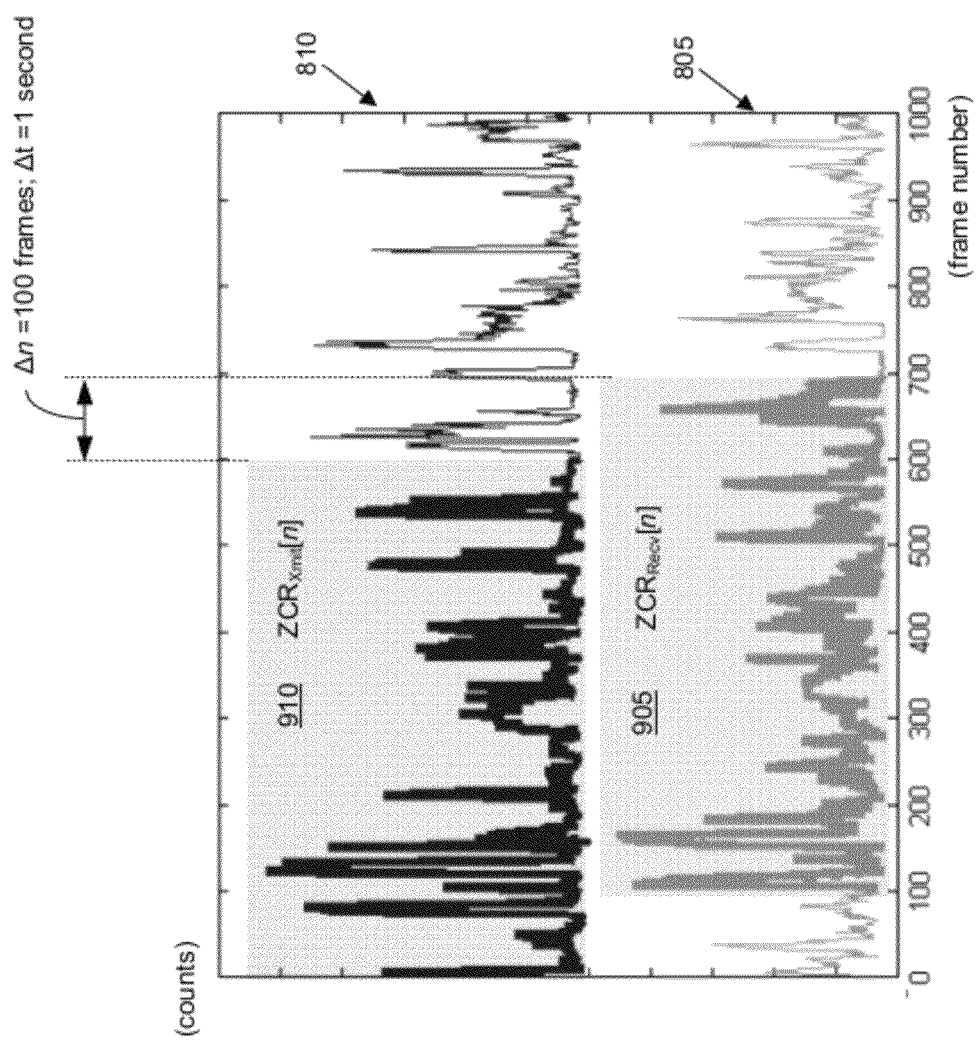
FIG. 10 shows zero-crossing samples of the first and second zero crossing sequence of FIG. 8 involved in a second cross-correlation calculation for lag n=100.

In contrast, FIG. 10 illustrates the case lag n=100. In this example, the dot product is taken between portions of $ZCR_{Recv}[n]$ and $ZCR_{Xmit}[n]$ offset by one (1) second (i.e., $\Delta n=100$).

By computing such dot products over a limited range of n, the correlation module 525 evaluates similarity between time delayed versions of $ZCR_{Recv}$ with $ZCR_{Xmit}$. For situations where echo is actually present, the best match would result for the value of lag n that corresponds to true delay between an original waveform and its echo. In one embodiment, the correlation module 525 is configured to limit the range of lag n to a range corresponding to a one-second delay between the Recv stream 450 and Xmit stream 455. Other embodiments are possible.

In some embodiments, the vectors $\vec{x}$ and $\vec{r}$ are normalized such that the calculated dot product between sections of the $ZCR_{Recv}[n]$ sequence and the $ZCR_{Xmit}[n]$ sequence is bound between −1 and 1.

In the example embodiment, unit vectors $\hat{x}$ and $\hat{r}$ are defined as:

$$\hat{x} = \frac{(\vec{x} - \text{mean}(\vec{x}))}{\|(\vec{x} - \text{mean}(\vec{x}))\|} \text{ and } \hat{r}_n = \frac{(\vec{r}_n - \text{mean}(\vec{r}_n))}{\|(\vec{r}_n - \text{mean}(\vec{r}_n))\|}.$$

The mean of the vectors $\vec{x}$ and $\vec{r}$ are defined as:

$$\text{mean}(\vec{x}) = \frac{1}{K}\sum_{k=0}^{K-1} x_k \text{ and } \text{mean}(\vec{r}_n) = \frac{1}{K}\sum_{k=0}^{K-1} r_{n,k}.$$

The norm of the vectors $\vec{x}$ and $\vec{r}$ are defined as:

$$\|\vec{x}\| = \sqrt{\langle \vec{x}, \vec{x} \rangle} \text{ and } \|\vec{r}_n\| = \sqrt{\langle \vec{r}_n, \vec{r}_n \rangle}.$$

With such normalization, the following holds:

$$\text{mean}(\hat{x}) = 0 \text{ and } \text{mean}(\hat{r}_n) = 0; \text{ and}$$

$$\|\hat{x}\| = 1 \text{ and } \|\hat{r}_n\| = 1.$$

According to this normalization, the summation is bound as:

$$-1 \leq c_{Xmit,Recv}[n] = \langle \hat{x}, \hat{r}_n \rangle \leq 1.$$

Figure 11:
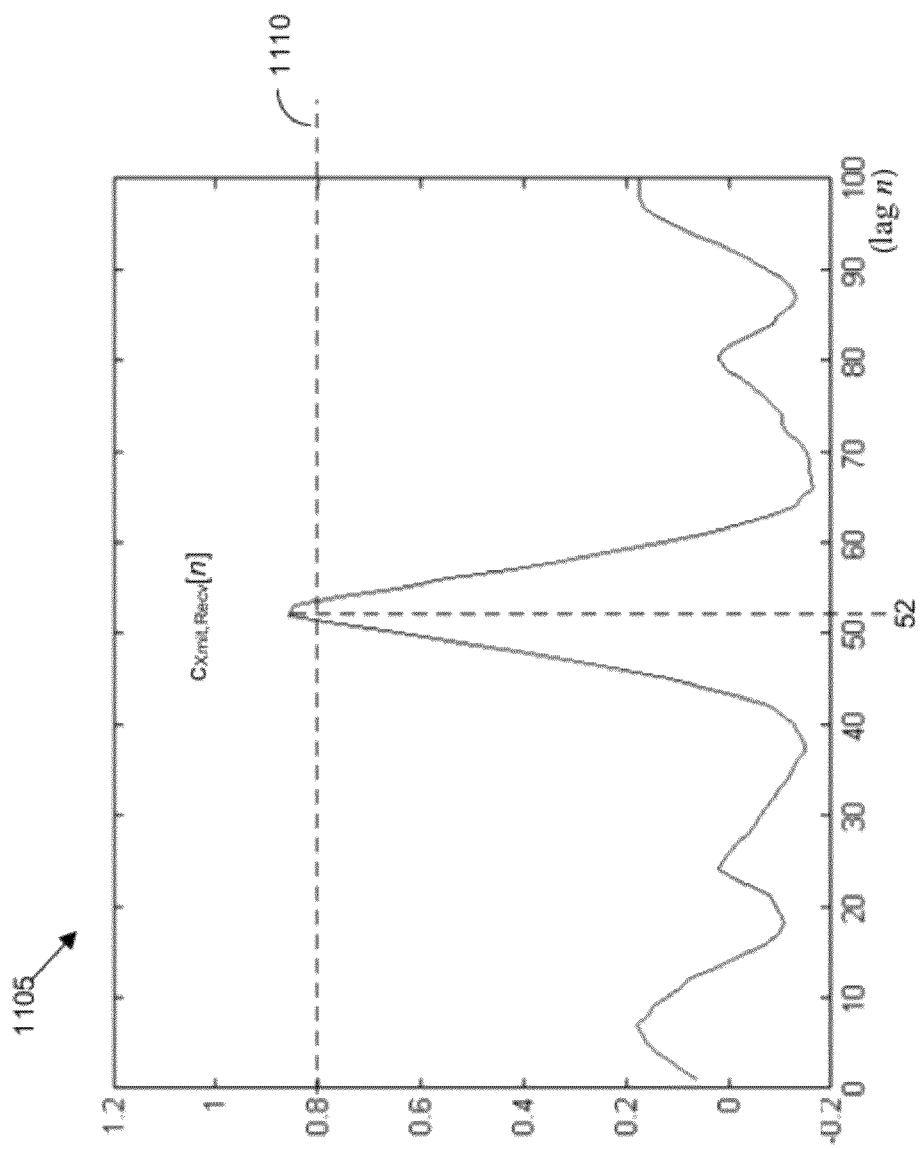
FIG. 11 shows cross-correlation results derived from first and second zero-crossing sequence of FIG. 8 for the range $0 \leq \text{lag } n \leq 100$.

FIG. 11 shows an example plot 1105 illustrating the dot product between normalized vectors $\hat{x}$ and $\hat{r}$ of the $ZCR_{Recv}[n]$ and $ZCR_{Xmit}[n]$ sequences of FIG. 8 for the range $0 \leq \text{lag } n \leq 100$. In the example embodiment, a maximum occurs at n=52. The correlation module 525 is configured to analyze the dot product between normalized vectors $\hat{x}$ and $\hat{r}$ to determine whether echo is present.

For example, by defining a threshold 1110, the data compare module 625 evaluates whether the maximum of the calculated dot product (i.e., at n=52) exceeds a predefined threshold value. In the example shown, the threshold value is arbitrarily defined as 0.8, and since the maximum occurring at lag n=52 is greater than the example threshold value, the correlation module 525 sends an alert 465 (e.g., FIGS. 4 and 5) to the endpoint device 305 such that action can be taken (e.g., muting the endpoint device 305, etc.) to eliminate or minimize the injection of echo into the teleconference. Other embodiments are possible. For example, in some embodiments, the correlation module 525 additionally or exclusively sends the alert 465 to one or more other endpoints (e.g., administrator, participant) of the teleconference for similar purpose.

In various embodiments, the alert 465 can take various forms. In one example, the alert 465 can be a textual alert that is sent to endpoint(s) that have the ability to receive and display text, color, and/or icons. The alert 465 can include an identification of the endpoint that is creating the echo, along with other information, such as a quantification of the amount of echo that is being injected. In other examples, the alert 465 can be an audio alert that is provided to the endpoint creating the echo. For example, the audio can state "You are creating echo in the teleconference. Please mute your telephone." In yet other examples, the alert 465 can be used to automatically mute and/or remove the endpoint creating the echo from the teleconference. Other examples are possible.

In example embodiments, echo detection continues following identification of an endpoint creating echo in the teleconference. Once criterion for raising the alert 465 is no longer true, because that endpoint has muted itself or taken other steps to remediate, the detection module 435 is configured to remove or clear the alert 465 at a later time.

Figure 12:
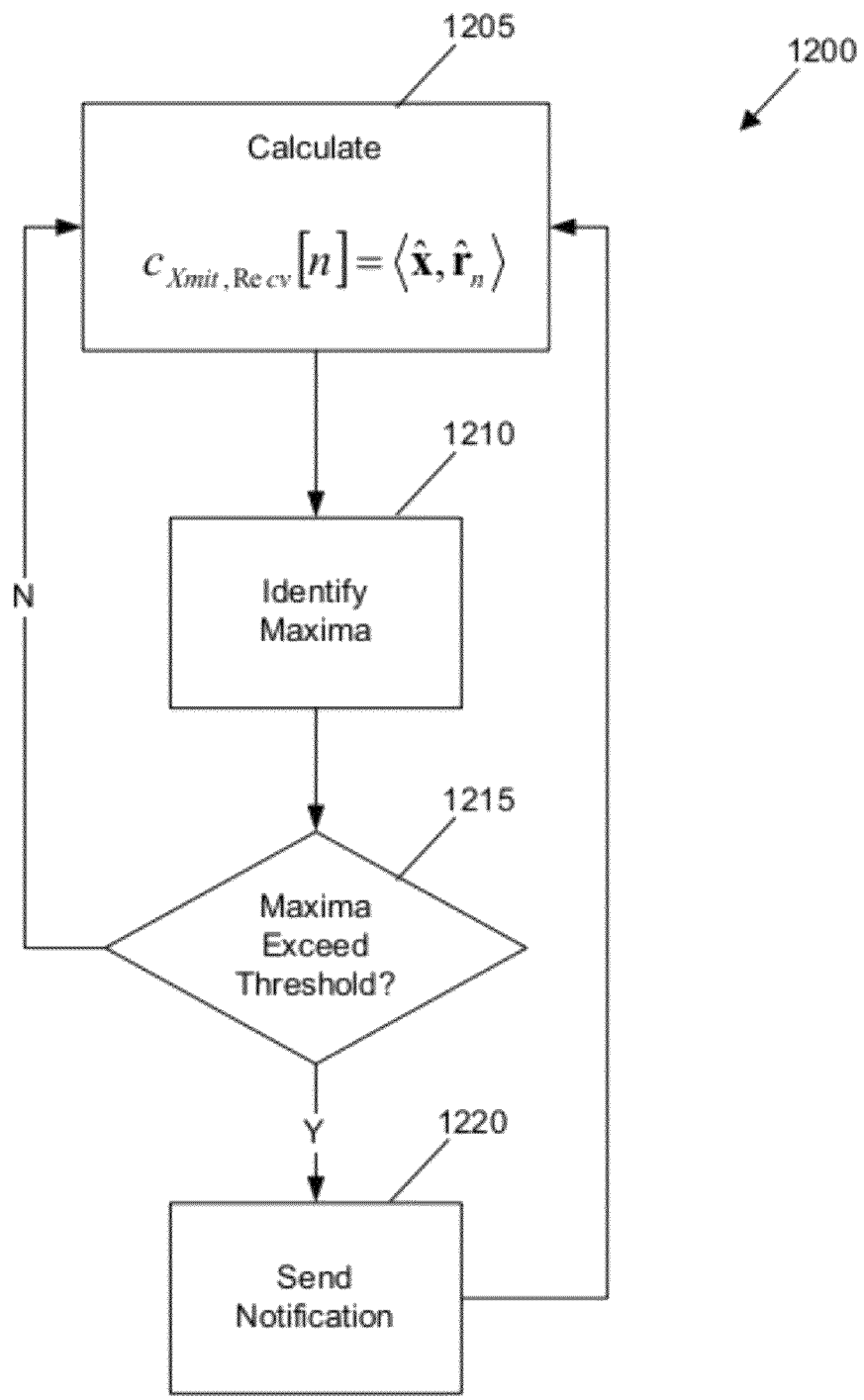
FIG. 12 shown an example method for detecting echo in a teleconference.

FIG. 12 shows an example method 1200 for detecting echo in a teleconference. In some embodiments, the method 1200 is implemented by the detection module 435 described above in connection with FIGS. 1-11.

The method 1200 begins at a cross-correlation module 1205. The example cross-correlation module 1205 is configured to evaluate similarity between time delayed versions of a first frame-based zero-crossing count data sequence (e.g., $ZCR_{Xmit}[n]$) and a second frame-based data zero-crossing count data sequence (e.g., $ZCR_{Recv}[n]$) by calculating an inner product of the same.

In the example embodiment, the first and second data sequence are derived from respective first and second input audio streams (e.g., Recv stream 450, Xmit stream 455) transmitted to and received from an endpoint (e.g., endpoint device 305) of the teleconference. While cross-correlation can be applied directly to the two input audio streams, much computation savings can be achieved by cross-correlating the lower-order, zero-crossing count statistic. In addition, operating on such a lower-order statistic also requires less timing precision, leading to more robustness against timing jitter observed in networks.

Operational flow proceeds to a derivation module 1210. The derivation module 1210 is configured to analyze the inner product result calculated by the cross-correlation module 1205 to identify a maximum value of the inner product. The derivation module 1210 is additionally configured to determine whether the maximum value of the inner product exceeds a predetermined threshold (e.g., threshold 1110) and generate a binary result representing the same (e.g., 0/1, Y/N, etc.). Other embodiments are possible.

Operational flow then proceeds to a decision module 1215. The decision module 1215 is configured to evaluate the binary result generated by the derivation module 1210. When the binary result indicates that the maximum value of the inner product has not exceeded the threshold, operational flow returns to the cross-correlation module 1205 for evaluating a second time delayed version of the first and second frame-based zero-crossing count data sequences.

When the binary result indicates that the maximum value of the inner product has exceeded the threshold, operational flow branches to a notification module 1220. The notification module 1220 is configured to send an alert (e.g., alert 465) to at least one of the endpoints of the teleconference (e.g., endpoint device 305) such that one or more actions can be taken to eliminate or minimize the injection of echo by the endpoint (e.g., endpoint device 305) into the teleconference. Operational flow then returns to the cross-correlation module 1205 for evaluating a second time delayed version of the first and second frame-based zero-crossing count data sequences.

The example method 1200 is beneficial in many aspects. For example, cross-correlation via analysis of the zero-crossing count statistic: i) reduces the computation requirements for cross-correlating over the same duration correlation window; ii) allows detection of echo as perceived by human users, despite noise and distortion; and iii) mitigates the algorithm sensitivity to timing jitter caused by network or system issues. Additionally, echo detection is achieved for each teleconference endpoint independent of: i) client software or device; ii) client audio settings, including volume control; iii) audio codecs; and/or iv) network transport type.

Figure 13:
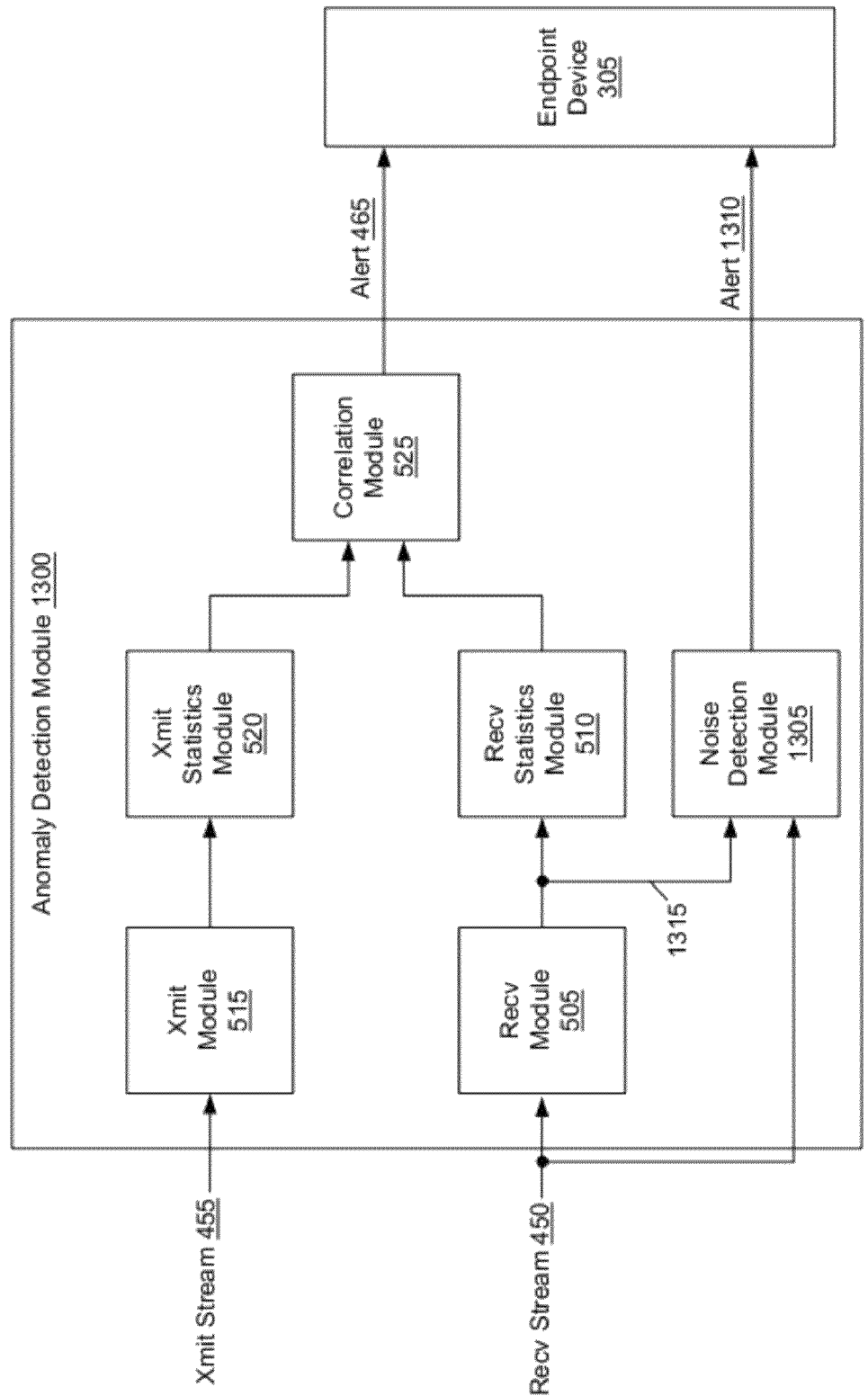
FIG. 13 shows a second example anomaly detection module.
Figure 14:
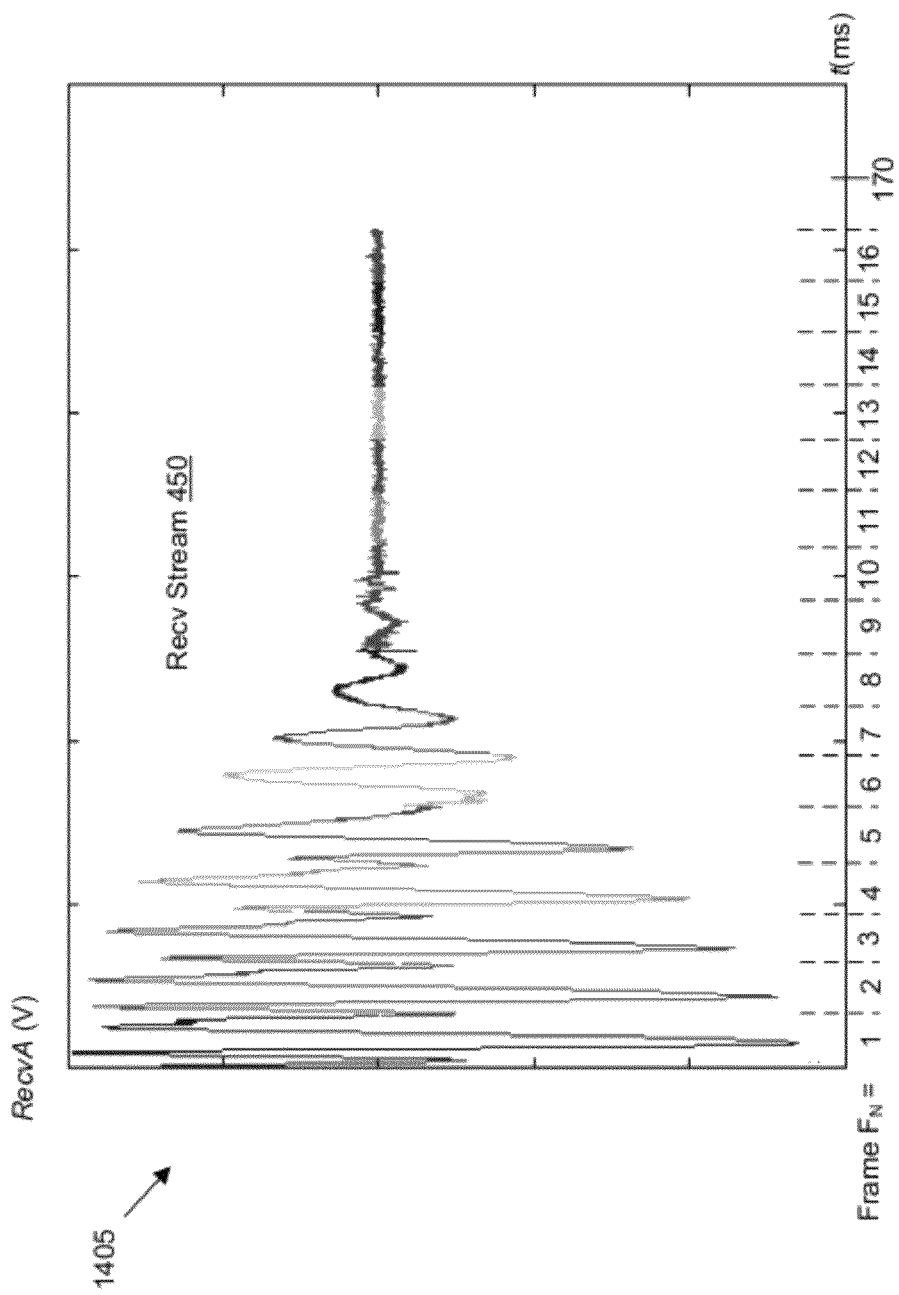
FIG. 14 shows a segment of the first audio stream of FIG. 6.

Referring now to FIGS. 13 and 14, a second anomaly detection module 1300 is shown and described in detail. FIG. 13 shows logical modules of the detection module 1300. The detection module 1300 is configured similar to the first anomaly detection module 435 described above, and additionally includes a noise detection module 1305 generally configured to notify a teleconference endpoint (e.g., endpoint device 305) when the respective endpoint is injecting too much noise into a teleconference. Example sources of noise include environmental noise or noisy devices such as bad microphones, etc.

In example embodiments, the noise detection module 1305 is a signal processing module configured to estimate noise power of the Recv stream 450 on a frame-by-frame basis, compare the noise power estimate against a threshold, and send an alert 1310 to one or more teleconference endpoints such that action can be taken (e.g., muting, disconnection, etc.) to eliminate or minimize the injection of excessive noise into the teleconference. In the example of FIG. 13, the Recv stream 450 is supplied to the noise detection module 1305 prior to processing of the Recv stream 450 by the Recv module 505. Other embodiments are possible in which the Recv stream 450 is supplied to the noise detection module 1305 following processing of the Recv stream 450 by the Recv module 505, designated in FIG. 13 by a signal path 1315.

In general, the alert 1310 is similar to the alert 465 and can take various forms. In one example, the alert 1310 can be a textual alert that is sent to endpoint(s) that have the ability to receive and display text, color, and/or icons. The alert 1310 can include an identification of the endpoint that is creating the noise, along with other information, such as a quantification of the amount of noise that is being injected. In other examples, the alert 1310 can be an audio alert that is provided to the endpoint creating the noise. For example, the audio can state "You are creating noise in the teleconference. Please disconnect your telephone." In yet other examples, the alert 1310 can be used to automatically mute and/or remove the endpoint creating the noise from the teleconference. Other examples are possible.

FIG. 14 shows an example one hundred and sixty (160) millisecond segment 1405 of the Recv stream 450 of FIG. 6. In this example, the Recv stream 450 is partitioned into ten (10) millisecond frames $F_N = F_1 - F_{16}$. For each frame $F_1 - F_{16}$, the noise detection module 1305 is configured to calculate a frame-specific RMS value to form a sequence $RMS_{Recv}[n]$:

$$RMS_{Recv}[n] = \sqrt{\frac{1}{K}\sum_{k=0}^{K-1}(r[n+k] - \bar{r}[n])^2}$$

$$\bar{r}[n] = \frac{1}{K}\sum_{k=0}^{K-1}r[n+k].$$

In the example shown, the sequence $RMS_{Recv}[n]$=2365, 2154, 1878, 1613, 1343, 1036, 634, 245, 114, 71, 33, 31, 32, 30, 31, 34. The RMS values of the example sequence $RMS_{Recv}[n]$ are used to refine an estimate of the noise floor of the segment 1405. For example, noise estimate N[0] is initialized to a relatively large value, for example 30,000 for a 16-bit PCM source. For all succeeding RMS values calculated via $RMS_{Recv}[n]$ a refined noise estimate is defined as:

$$N[n+1] = N[n] + \alpha_U(RMS_{Recv}[n] - N[n]), \text{ if } N[n] < RMS_{Recv}[n]$$

$$N[n+1] = N[n] + \alpha_D(RMS_{Recv}[n] - N[n]), \text{ if } N[n] > RMS_{Recv}[n]$$

Time constants $\alpha_U$ and $\alpha_D$ define upward and downward convergence, respectively, of the noise estimate and are selected such that downward convergence is much faster, in order to track the noise floor. For example, in some embodiments, $\alpha_U$=0.002 and $\alpha_D$=10*$\alpha_U$=0.02. The noise estimate is then compared against a threshold value such as, for example, 40 dB below full scale or about 300 for a 16-bit PCM input. Other embodiments are possible. The example noise detection module 1305 is configured to trigger the alert 1310 when the noise estimate is greater than the threshold value.

The example embodiments described herein can be implemented as logical operations in a computing device in a networked computing system environment. The logical operations can be implemented as: (i) a sequence of computer implemented instructions, steps, or program modules running on a computing device; and (ii) interconnected logic or hardware modules running within a computing device.

For example, the logical operations can be implemented as algorithms in software, firmware, analog/digital circuitry, and/or any combination thereof, without deviating from the scope of the present disclosure. The software, firmware, or similar sequence of computer instructions can be encoded and stored upon a computer readable storage medium and can also be encoded within a carrier-wave signal for transmission between computing devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for detecting an anomaly in a teleconference communication signal, the method comprising:
receiving, at a computing device, a first signal comprising audio generated by a first endpoint of a plurality of endpoints connected to a teleconference;
receiving a second signal comprising a summation of audio generated by each of the plurality of endpoints other than the first endpoint;
generating a first data sequence comprising a number of zero-crossings per unit time of the first signal;
generating a second data sequence comprising a number of zero-crossings per unit time of the second signal;
calculating an inner product between the first and second data sequences;
comparing a maximum value of the inner product to a first threshold value; and
sending an alert notifying at least one of the plurality of endpoints that the first endpoint is a source of echo upon the maximum value of the inner product exceeding the first threshold value.

2. The method of claim 1, wherein the inner product is defined by a cross-correlation function:

$$c_{Xmit,Recv}[n] = \sum_{k=0}^{K-1} ZCR_{Xmit}[k]ZCR_{Recv}[n+k].$$

3. The method of claim 2, further comprising normalizing the cross-correlation function to bound the inner product between −1 and 1.

4. The method of claim 2, further comprising calculating the inner product over a finite integer value n corresponding to a plurality of time delayed versions of the first and second data sequences.

5. The method of claim 1, further comprising pre-processing the first and second signal prior to generating the first and second data sequence.

6. The method of claim 5, further comprising level shifting the first and second signal to zero DC voltage offset.

7. The method of claim 5, further comprising sampling at least one of the first and second signals to a common sample rate.

8. The method of claim 5, further comprising one of: decoding the first signal to a non-network transmission format prior to generating the first data sequence; and generating the first data sequence directly from the first signal in a network transmission format.

9. The method of claim 1, further comprising encoding the second signal to a network transmission format and transferring the second signal to each of the plurality of teleconference endpoints.

10. The method of claim 1, further comprising generating a third data sequence comprising an RMS noise value of the first signal per unit time.

11. The method of claim 10, further comprising:
estimating a noise power of the first signal based on the third data sequence;
comparing the noise power to a second threshold value; and
sending a noise alert notifying at least one of the plurality of endpoints that the first endpoint is a source of noise upon the noise power exceeding the second threshold value.

12. A computing device, comprising:
a processing unit; and
a system memory connected to the processing unit, the system memory including instructions that, when executed by the processing unit, cause the processing unit to implement a detection module configured to detect an anomaly in a communication signal of a teleconference, wherein the detection module comprises:
a first module configured to implement signal processing of a first signal comprising audio generated by a first endpoint of a plurality of endpoints connected to the teleconference and a second signal comprising a summation of audio generated by each of the plurality of endpoints other than the first endpoint, wherein the signal processing includes level shifting the first and second signal to zero DC voltage offset and sampling at least one of the first and second signal to a common sample rate;
a second module configured to generate a first data sequence comprising a number of zero-crossings per unit time of the first signal and generate a second data sequence comprising a number zero-crossings per unit time of the second signal; and
a correlation module configured to calculate an inner product between the first and second data sequences, compare a maximum value of the inner product to a threshold value, and notify at least one of the plurality of endpoints that the first endpoint is a source of echo upon the maximum value exceeding the threshold value.

13. The computing device of claim 12, wherein the inner product is defined by a cross-correlation function:

$$c_{Xmit,Recv}[n] = \sum_{k=0}^{K-1} ZCR_{Xmit}[k]ZCR_{Recv}[n+k].$$

14. The computing device of claim 13, wherein the cross-correlation function is normalized bounding the inner product between −1 and 1.

15. The computing device of claim 13, wherein the correlation module is configured to calculate the inner product over a finite integer value n corresponding to a plurality of time delayed versions of the first and second data sequences.

16. The computing device of claim 12, wherein the first module is further configured to receive an endpoint-specific signal comprising audio generated by a second endpoint of the plurality of endpoints; the second module is further configured to generate an endpoint-specific sequence comprising a number of zero-crossings per unit time of the endpoint-specific signal; and the correlation module is further configured to calculate a second inner product between the endpoint-specific and second data sequences and compare a maximum value of the calculated second inner product to the threshold value.

17. The computing device of claim 16, wherein the correlation module is further configured to notify at least one of the plurality of endpoints that the second endpoint is a source of echo upon the maximum value of the calculated second inner product exceeding the threshold value.

18. The computing device of claim 12, further comprising a third module configured to generate a third data sequence comprising an RMS noise value of the first signal per unit time.

19. The computing device of claim 18, wherein the third module is further configured to estimate a noise power based on the third data sequence, compare the noise power to a second threshold value, and send a noise alert notifying at least one of the plurality of endpoints that the first endpoint is a source of noise upon the noise power exceeding the second threshold value.

20. A computer readable storage medium having computer-executable instructions that, when executed by a computing device, cause the computing device to perform steps comprising:
  receiving a first signal comprising audio generated by a first endpoint of a plurality of endpoints connected to a teleconference;
  receiving a second signal comprising a summation of audio generated by each of the plurality of endpoints other than the first endpoint;
  processing the first and second signal comprising level shifting the first and second signal to zero DC voltage offset and sampling at least one of the first and second signal to a common sample rate;
  generating a first data sequence comprising a number of zero-crossings per unit time of the first signal;
  generating a second data sequence comprising a number of zero-crossings per unit time of the second signal;
  generating a third data sequence comprising an RMS noise value of the first signal per unit time;
  calculating an inner product between the first and second data sequences over a finite integer value n corresponding to a plurality of time delayed versions of the first and second data sequences, wherein the inner product is defined by a normalized cross-correlation function bound between −1 and 1:

$$c_{Xmit,Recv}[n] = \sum_{k=0}^{K-1} ZCR_{Xmit}[k] ZCR_{Recv}[n+k];$$

comparing a maximum value of the inner product to a threshold value;
  notifying at least one of the plurality of endpoints that the first endpoint is a source of echo upon the maximum value exceeding the threshold value;
  estimating a noise power based on the third data sequence;
  comparing the noise power to a second threshold value; and
  sending a noise alert notifying at least one of the plurality of endpoints that the first endpoint is a source of noise upon the noise power exceeding the second threshold value.

* * * * *